(12) United States Patent
Ishiyama et al.

(10) Patent No.: US 10,497,134 B2
(45) Date of Patent: Dec. 3, 2019

(54) VERIFICATION METHOD, VERIFICATION SYSTEM, APPARATUS, VERIFICATION APPARATUS, AND PROGRAM

(71) Applicant: NEC Corporation, Tokyo (JP)

(72) Inventors: Rui Ishiyama, Tokyo (JP); Toru Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/409,638

(22) PCT Filed: Jun. 21, 2013

(86) PCT No.: PCT/JP2013/067124
§ 371 (c)(1),
(2) Date: Dec. 19, 2014

(87) PCT Pub. No.: WO2013/191282
PCT Pub. Date: Dec. 27, 2013

(65) Prior Publication Data
US 2015/0154760 A1    Jun. 4, 2015

(30) Foreign Application Priority Data

Jun. 22, 2012 (JP) .................................. 2012-140356

(51) Int. Cl.
*G06K 9/00* (2006.01)
*G06T 7/40* (2017.01)
(Continued)

(52) U.S. Cl.
CPC ................ *G06T 7/40* (2013.01); *G06F 16/51* (2019.01); *G06K 9/00577* (2013.01);
(Continued)

(58) Field of Classification Search
None
See application file for complete search history.

(56) References Cited

U.S. PATENT DOCUMENTS 5,588,428 A * 12/1996 Smith .................. A61B 5/1077
                                                 382/128
5,786,910 A    7/1998 Walters et al.
(Continued)

FOREIGN PATENT DOCUMENTS

CN        102083605 A    6/2011
EP         0838067 A2    4/1998
(Continued)

OTHER PUBLICATIONS

International Search Report corresponding to PCT/JP2013/067124, dated Aug. 27, 2013, 1 page.
(Continued)

*Primary Examiner* — Fred H Hu
(74) *Attorney, Agent, or Firm* — Wilmer Cutler Pickering Hale and Dorr LLP

(57) ABSTRACT

The present invention is a verification method comprising: designating as a verification area at least a part of a predetermined area of an article that has a textured pattern provided thereto, and previously storing at least one or more image features of the textured pattern of the verification area; acquiring the image feature of the textured pattern that is provided to the verification area of an article to be verified; and verifying the article to be verified by using the acquired image feature and the stored image features.

11 Claims, 11 Drawing Sheets

IMAGE FEATURE OF TEXTURED PATTERN

IMAGE FEATURE OF TEXTURED PATTERN OF ARTICLE TO BE VERIFIED

(51) Int. Cl.
   *G06F 16/51* (2019.01)
   *G06Q 10/08* (2012.01)
   *G06K 9/62* (2006.01)
   *G06Q 50/04* (2012.01)
(52) U.S. Cl.
   CPC ........... *G06K 9/6267* (2013.01); *G06Q 10/08* (2013.01); *G06K 2009/00583* (2013.01); *G06Q 50/04* (2013.01); *Y02P 90/30* (2015.11)

(56) References Cited

U.S. PATENT DOCUMENTS

| | | | |
|---|---|---|---|
| 8,766,766 B2 * | 7/2014 | Yamamoto | G06K 7/00 340/5.1 |
| 2004/0156529 A1 | 8/2004 | Davis et al. | |
| 2005/0180599 A1 | 8/2005 | Davis et al. | |
| 2007/0171761 A1 | 7/2007 | Davis et al. | |
| 2008/0219503 A1 * | 9/2008 | Di Venuto | G06K 9/00577 382/103 |
| 2009/0089175 A1 * | 4/2009 | Platek | G06Q 10/08 705/26.1 |
| 2010/0220364 A1 | 9/2010 | Picard et al. | |
| 2011/0096955 A1 | 4/2011 | Voloshynovskiy et al. | |
| 2011/0115127 A1 | 5/2011 | Breest et al. | |
| 2011/0150342 A1 | 6/2011 | Franken et al. | |
| 2011/0283369 A1 | 11/2011 | Green | |
| 2012/0043648 A1 | 2/2012 | Matsumaru et al. | |
| 2012/0045114 A1 | 2/2012 | Matsumaru et al. | |
| 2014/0112525 A1 | 4/2014 | Picard et al. | |
| 2014/0284382 A1 | 9/2014 | Park | |
| 2017/0286769 A1 * | 10/2017 | Di Venuto Dayer, V et al. | G06K 9/00577 |

FOREIGN PATENT DOCUMENTS

| | | | |
|---|---|---|---|
| EP | 1755065 A2 | | 2/2007 |
| EP | 2214133 A1 | | 8/2010 |
| JP | 2002-125721 A | | 5/2002 |
| JP | 2005-251183 A | | 9/2005 |
| JP | 2006-146570 A | | 6/2006 |
| JP | 2009-187580 A | | 8/2009 |
| JP | 2011-048710 A | | 3/2011 |
| JP | 2011048710 A | * | 3/2011 |
| JP | 2012-043953 | | 3/2012 |
| WO | WO-96/36010 A2 | | 11/1996 |
| WO | WO-2009/044826 A1 | | 4/2009 |
| WO | WO-2012/057459 A1 | | 5/2012 |

OTHER PUBLICATIONS

Chinese Office Action issued in corresponding Chinese Application No. 201380040221.5, dated Jul. 6, 2016, 10 pages.

Extended European Search Report issued by the European Patent Office for Application No. 13807053.7 dated Jun. 7, 2016 (14 pages).

Extended European Search Report issued in corresponding European Application No. 13807053.7, dated Feb. 8, 2016, 7 pages.

Japanese Office Action issued by the Japan Patent Office for Japanese Application No. 2014-521526 dated Jul. 12, 2017 (4 pages)—Japanese Language.

Decision to Grant a Patent issued by the Japan Patent Office for Japanese Application No. 2014-521526 dated Aug. 22, 2018 (6 pages).

* cited by examiner

FIG. 7

| MOLD | IMAGE FEATURE |
|---|---|
| MOLD 1 | XXX |
| MOLD 2 | YYY |
| ... | ... |
| MOLD N | ZZZ |

FIG. 9

| FASTENER ID | IMAGE FEATURE |
|---|---|
| FASTENER 1 | XXX |
| FASTENER 2 | YYY |

· · ·   · · ·

| FASTENER N | ZZZ |

FIG. 11

| FASTENER ID | IMAGE FEATURE ||
| --- | --- | --- |
| | MOLD DIFFERENCE IMAGE FEATURE | INDIVIDUAL DIFFERENCE IMAGE FEATURE |
| FASTENER 1 | MOLD A AAA | XXX |
| FASTENER 2 | | YYY |
| ... | | ... |
| FASTENER N | | ZZZ |
| FASTENER 111 | MOLD B BBB | XXX |
| FASTENER 112 | | YYY |
| ... | | ... |
| FASTENER 11N | | ZZZ |
| ... | ... | ... |

VERIFICATION METHOD, VERIFICATION SYSTEM, APPARATUS, VERIFICATION APPARATUS, AND PROGRAM

CROSS-REFERENCE TO RELATED APPLICATIONS

This application is a national stage application of International Application No. PCT/JP2013/067124 entitled "VERIFICATION METHOD, VERIFICATION SYSTEM, APPARATUS, VERIFICATION APPARATUS, AND PROGRAM" filed on Jun. 21, 2013, which claims priority to Japanese Patent Application No. 2012-140356 filed on Jun. 22, 2012, the disclosure of which is hereby incorporated by reference in their entirety.

TECHNICAL FIELD

The present invention relates to a verification method, a verification system, an apparatus, a verification apparatus, and a program.

BACKGROUND ART

Recently, for a quality control and a distribution control, need for verification and identification to products increases in molds, in units of lots, or in units of individual.

To cope with the above, an RFID for performing data communication through a radio communication system is built into a product. Further, a comprehensive merchandise management from production to a physical distribution, sales, and the like of the product, loss prevention, theft prevention, forgery prevention, or the like of merchandise is performed.

In a technology of Patent Literature 1 and Patent Literature 2, for example, an RFID chip is arranged at a fastener that is fixed on an article. Through the above configuration, the verification for a physical distribution management, an authenticity assessment of merchandise, or the like can be performed by using data stored in a memory of the RFID chip.

CITATION LIST

Patent Literature

Patent Literature 1: Japanese Laid-open Patent Publication No. 2009-187580
Patent Literature 2: Japanese Laid-open Patent Publication No. 2002-125721

SUMMARY OF INVENTION

Technical Problem

However, there is a problem that in technologies of Patent Literatures 1 and 2, for example, high costs are required to build an RFID chip into an article like a fastener one by one.

Further, when the article is a small article such as a fastener, even an ordinary tag cannot be fixed, to say nothing of special device such as an RFID chip, in many cases.

The present invention is made to solve the above problem. Therefore, the purpose of the present invention is to provide a verification method, a verification system, an apparatus, a verification apparatus, and a program that do not require a special device such as an IC tag, and are capable of verify articles.

Solution to Problem

The present invention is directed to a verification method comprising: designating as a verification area at least a part of a predetermined area of an article that has a textured pattern provided thereto, and previously storing at least one or more image features of the textured pattern of the verification area; acquiring the image feature of the textured pattern that is provided to the verification area of an article to be verified; and verifying the article to be verified by using the acquired image feature and the stored image features.

The present invention is directed to a verification system comprising: an image feature storing means for storing at least one or more image features of a textured pattern in a verification area, the verification area being at least a part of a predetermined area of an article that has the textured pattern provided; and a verifying means for verifying, by using the image feature of the textured pattern provided to the verification area of an article to be verified and the stored image features, the article to be verified.

The present invention is directed to an apparatus comprising: an acquiring means for acquiring an image obtained by imaging a textured pattern provided to an article; and an outputting means for outputting a result of verifying a first image and a second image obtained by imaging the textured pattern provided to the article.

The present invention is directed to a verification apparatus comprising: a verifying means for, by using at least one or more previously-stored image features of a textured pattern in a verification area, the verification area being at least a part of a predetermined area of an article that has the textured pattern provided, and acquired image feature of the textured pattern in the verification area of an article to be verified, verifying the article to be verified.

The present invention is directed to a program for causing a computer to execute a verification process of, by using at least one or more previously-stored image features of a textured pattern in a verification area, the verification area being at least a part of a predetermined area of an article that has the textured pattern provided, and acquired image feature of the textured pattern in the verification area of an article to be verified, verifying the article to be verified.

Advantageous Effects of Invention

According to the present invention, a special device such as an IC tag is not required and an article can be verified.

BRIEF DESCRIPTION OF DRAWINGS

FIG. 7 is a view illustrating an example of an image feature database 103.

FIG. 9 is a view illustrating an example of an image feature database 203.

FIG. 11 is a view illustrating an example of an image feature database 303.

DESCRIPTION OF EMBODIMENTS

First Embodiment

A first embodiment of the present invention will be described.

Figure 1:
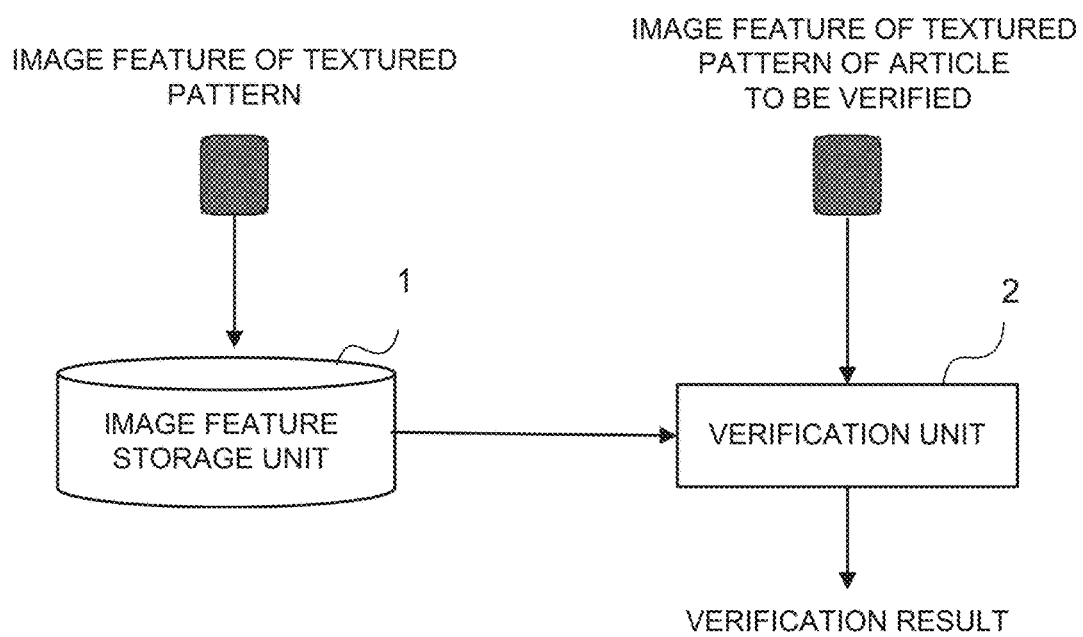
FIG. 1 is a block diagram according to a first embodiment.

FIG. 1 is a block diagram according to the first embodiment of the present invention.

According to the first embodiment of the present invention, a verification system includes an image feature storage unit 1 that designates as a verification area at least a part of a predetermined area of an article that has a textured pattern provided thereto, and that stores image features of the textured pattern in the verification area, and a verification unit 2 that verifies an article to be verified by using the image feature of the textured pattern provided to the verification area of the article to be verified and the stored image features.

Specifically, the present embodiment is characterized in that features in which when the textured pattern that is provided to the article is delicately different in each individual, or as described below, when the articles are the same kind of articles, the textured pattern has a certain level of commonality, and the like are used, and at least a part of a predetermined area of the article that has the textured pattern provided thereto is designated as the verification area, and a verification (identification) of the article is performed through the textured pattern of the verification area.

Here, the article is referred to as a manufactured article manufactured by a manufacturer. Like a TV set, a personal computer, a smartphone, a bag, and the like, the article includes a product that general consumers buy as one completed product, and a component used in the one completed product. Examples of the component include a fastener (a slide fastener, a hook and loop fastener, a snap fastener, a rail fastener, a buckle, a cord stopper, a belt adjuster, a loop clutch, a snap button, a button, and the like), a screw, a nail, a semiconductor chip, a plastics component, and the like.

Further, examples of the textured pattern include not only a case where the textured pattern is formed as design, but also a case where the textured pattern is intentionally formed in the verification area for the purpose of identification or verification of articles.

Figure 2:
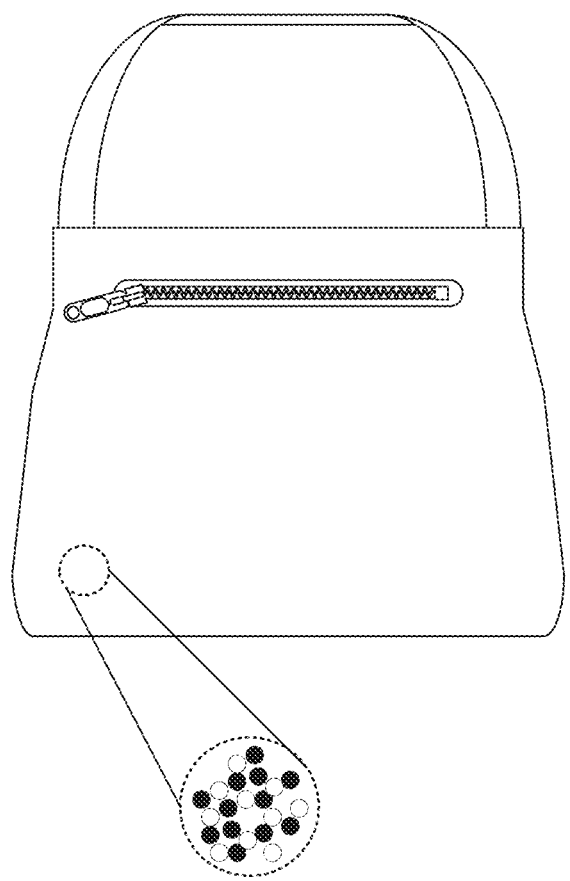
FIG. 2 is a view for illustrating a textured pattern of a leather product.

Further, the textured pattern has a concept including not only the textured pattern provided by processing to the after-mentioned metal, synthetic resins (plastics and the like), or the like, but also a wrinkle pattern (grain) and the like obtained by processing (for example, emboss processing) a surface of a leather product. As illustrated in FIG. 2, for example, in the case of a bag of leather that has the emboss processing applied thereto, fine irregularities are formed at random on a surface of the leather of the bag, and the fine irregularities can be considered to be equal to the textured pattern.

Processing of the textured pattern provided to the article, for example, processing applied to metals, synthetic resins (plastics and the like), or the like is considered to be roughly divided into two methods.

One is a processing method for providing the textured pattern to a mold that manufactures the article by injection molding or casting. In a textured finish to the mold, various methods such as etching and blasting, can be used. In a general method, a particle size and the like of the textured pattern can be controlled. Further, also a position and a size of the fine irregularity are not correctly reproduced one by one but a random pattern is generated in each case of the processing. Accordingly, in the case where the mold that manufactures the same article is fabricated in plurality, the fine irregularities in a textured finish area through each mold are different from each other in each mold. Also in the case where an imitation product is fabricated, of course, it is possible to imitate the same mold at a glance. However, it is difficult to completely take out the fine irregularities of the textured pattern one by one. Through the processing method, an approximately identical textured pattern can be provided to all individuals fabricated by the same mold. On the contrary, when a different mold is used, fine features of the textured pattern are different from each other. In the case of the above-described processing, at least one or more are selected from among an individual group (article group) that has the textured pattern provided thereto by a certain mold. Further, the image features of the textured pattern in the verification area of the individual are registered as a representative value being a reference of the verification in the image feature storage unit 1. Further, an article individual having the image features that are consistent with the image features registered in the image feature storage unit 1 can be verified as an article that has the textured pattern provided thereto by the mold.

This method has the advantage of being able to verify the individual group (article group) fabricated by a specific mold by using small registration data.

In another method, fine surface irregularities are generated by a plating process, painting, or the texture processing through a process of generating random fine irregular patterns in each individual of the articles through etching, blasting, cutting, crystallization and powder painting, dispersion plating process, or the like. In the case of using the above-described processing, provided textured pattern is different in each individual of the articles. Therefore, in each individual of the articles, the image features of the textured pattern provided to the verification area are registered in the image feature storage unit 1. Further, an article having the image feature that is consistent with image features registered in the image feature storage unit 1 can be verified as the article registered in the image feature storage unit 1.

This method has the advantageous effect capable of verifying (identifying) the articles in units of individuals since the textured pattern is different in each individual of the articles.

Further, the above-described two methods are combined and the painting and the plating process are further applied to a portion that has the textured process applied thereto by the mold. Thereby, generation in a difference between individuals in the fine irregularities can be advanced, and further an identification property can be improved. At this time, a difference between features in each mold still remains and a difference between features in each individual due to a process is further added, and thereby both can be verified, respectively. Particularly, a size of the irregularity of the textured process that is applied to the mold is made rougher than that of the textured process in a subsequent stage, and thereby a difference between the molds can be made larger than a difference between individuals. By use of the above method, a threshold to a degree of similarity of the feature amount at the time of the verification can be set loosely at the time of the verification in each mold as compared to the time of the verification in each individual, and verified by using small registration data as described above. Further, by using this advantage, the verification throughput can be reduced by hierarchic verification.

Next, when the verification area is an area that has the textured pattern provided thereto, it is not particularly limited. Further, it is to be desired that ease of the verification processing be considered and the verification area be previously determined. As the verification area, an area of a position in which a reference portion that is present in common to the articles is determined as a reference is considered to be designated as the verification area. Examples of the reference portion of the articles include a trademark, a logo, a manufacturer name, a manufacturing company, a brand name, a manufacture name, and a serial number, and the like of the product attached, printed, die stamped, or heated and printed to or in the article. When the articles are the same, these reference portions have the same pattern in common regardless of the individuals, and are distinctively viewed from an external appearance. Further, when a position and an attitude of the reference portion are determined as a reference and the features are stored, the verification area of the articles can be automatically detected.

Further, a member (adapter) that is engaged with the side of the article that has the textured pattern provided thereto may be prepared, a hollow wall (hole) capable of viewing (imaging) the textured pattern from the outside may be provided in a part of the member, and an area capable of viewing (imaging) the textured pattern may be designated as the verification area. As described above, in each case where the position and the attitude in the verification area are identified, it is unnecessary to recognize the position and the attitude in the verification area and the verification area can be definitely identified.

In addition, the image features of the textured pattern for the verification may be different even in the same individual of the articles depending on lighting conditions at the time of imaging the textured pattern that is provided to the article. The reason is that the textured pattern is formed by fine irregularities, positions of shadows caused by the irregularities are different depending on the irradiation direction of light, and as a result the image features of the textured pattern are other image features. Accordingly, the textured pattern registered in the image feature storage unit 1 and the textured pattern of the article to be verified are preferably photographed under the same lighting conditions. With the use of the adapter, when the article, the lighting, the position, and the attitude of an image pickup device are mutually fixed, the above problem can be solved.

Next, as an example of the article, a specific embodiment will be described with reference to a fastener 10.

Figure 3:
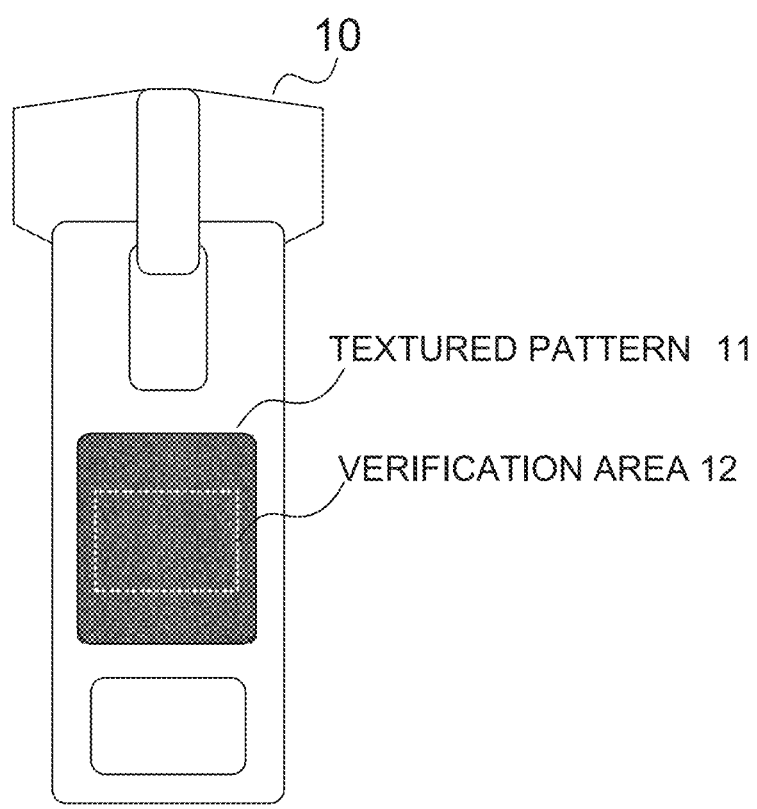
FIG. 3 is a view for illustrating a fastener 10 as an example of an article.

FIG. 3 is a view for illustrating the fastener 10 as an example of the article.

To a predetermined area of the pull-tab of the fastener 10, the textured pattern 11 is provided. In the present example, a predetermined range of the textured pattern 11 is designated as the verification area 12, and further the entire area that has the textured pattern 11 provided thereto may be designated as the verification area.

Figure 4:
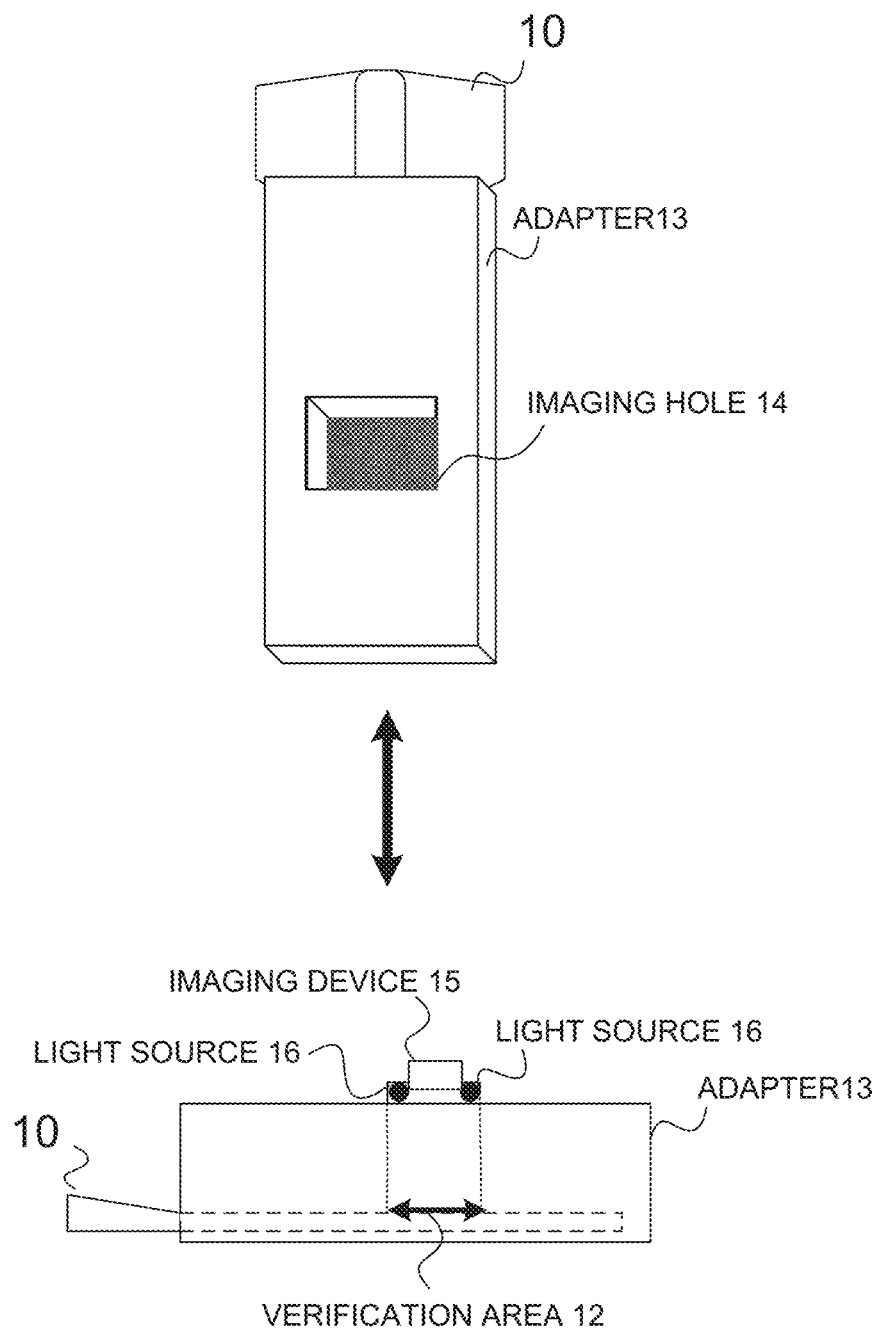
FIG. 4 is a view for illustrating an adapter 13.

Here, in the present embodiment, how to determine the verification area is to determine the verification area 12 by the adapter 13 that is engaged with the fastener 10 on the side of the textured pattern 11. An example of the adapter 13 is illustrated in FIG. 4. The adapter 13 is configured so as to be engaged with the fastener 10 on the side of the textured pattern 11, and is formed in a shape to cover the fastener 10. Further, the fastener 10 is inserted into a deep location of an internal wall of the adapter 13, and thereby the adapter 13 is configured so as to fix a position and an attitude of the fastener 10. Further, on the adapter 13, an imaging hole 14 is provided so as to photograph a part of the textured pattern 11 of the fastener 10. Further, an area to be determined through the imaging hole 14 is designated as the verification area 12.

Next, the textured pattern 11 of the verification area 12 is photographed by a photographic device 15. The photographic device 15 is fixed so as to cover the imaging hole 14. Further, light sources 16 for imaging are provided on the side of the adapter 13.

The adapter 13 and the photographic device 15 are configured as described above, and thereby the verification area 12 of the fastener 10 can be uniformly determined. Further, the light sources 16 are arranged in a given position toward the verification area 12. As a result, the textured pattern in the verification area 12 can be photographed under the same lighting conditions, and a change in the image features of the textured pattern generated by a change in the lighting conditions can be prevented.

Next, the image features of the image feature storage unit 1 are registered. In the texture processing through the mold, about several fasteners 10 are selected from the fasteners 10 that have the texture processing applied thereto by the mold, the adapters 13 are engaged with the fasteners 10, and the textured pattern 11 in the verification area 12 is photographed by the photographic device 15. Further, in the texture processing through the process, the adapter 13 is engaged with each of the fasteners 10, and the textured pattern 11 in the verification area 12 is photographed by the photographic device 15. The image feature is extracted from the imaged textured pattern 11, and is registered in the image feature storage unit 1. In the extraction of the image feature from the imaged image, an extraction technique of the image feature of fingerprints such as luminance values and feature points of the image, inflection points, intersection points, end-points, and central points of lines of a binary image can be used.

On the other hand, in the case where the fastener 10 is verified, the fastener 10 to be verified is photographed by the same imaging method as that of the above, and an image of the textured pattern 11 in the verification area 12 of the fastener 10 to be verified is acquired. The image features from the imaged image are extracted in the same manner as in the above.

The verification unit 2 compares the image feature of the fastener 10 to be verified and the image features stored in the image feature storage unit 1. Suppose, for example, that the number of combinations of the minutiae in the same position (a range within a certain threshold) is more than or equal to a predetermined number. In this case, both are consistent with each other is determined, and the fastener 10 to be verified is the same as that registered in the image feature storage unit 1 is determined.

As described above, according to the first embodiment, a special device such as a tag for identifying the article or an RFID tag is not particularly used but components can be verified through the textured pattern generated in a normal production process of the components.

Figure 5:
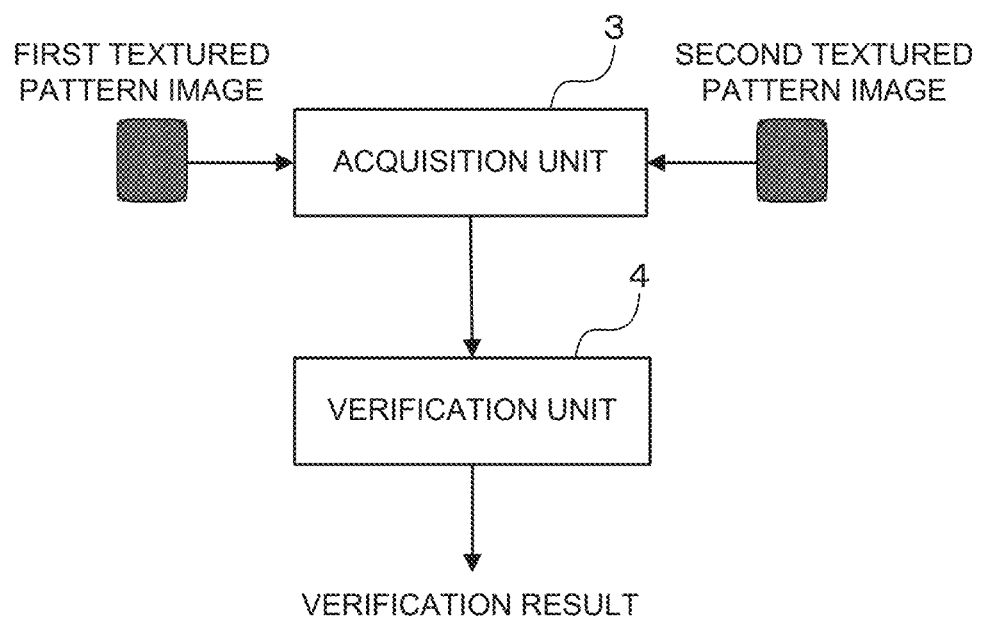
FIG. 5 is a block diagram of a modification according to the first embodiment.

The first embodiment as described above has a configuration in which the verification unit 2 inputs and verifies the image features of the textured pattern; however, it is not limited thereto. As illustrated in FIG. 5, for example, an acquisition unit 3 may acquire a first textured image and a second textured image, and a verification unit 4 may verify the acquired first and second textured images, and output verification results.

Even the above-described configuration can acquire the same advantageous effects as those of the first embodiment.

Second Embodiment

A second embodiment will be described.

The second embodiment relates to a verification system of a fastener in the case where an article is designated as the fastener as an example, and the fastener has a textured pattern provided thereto by a mold.

Figure 6:
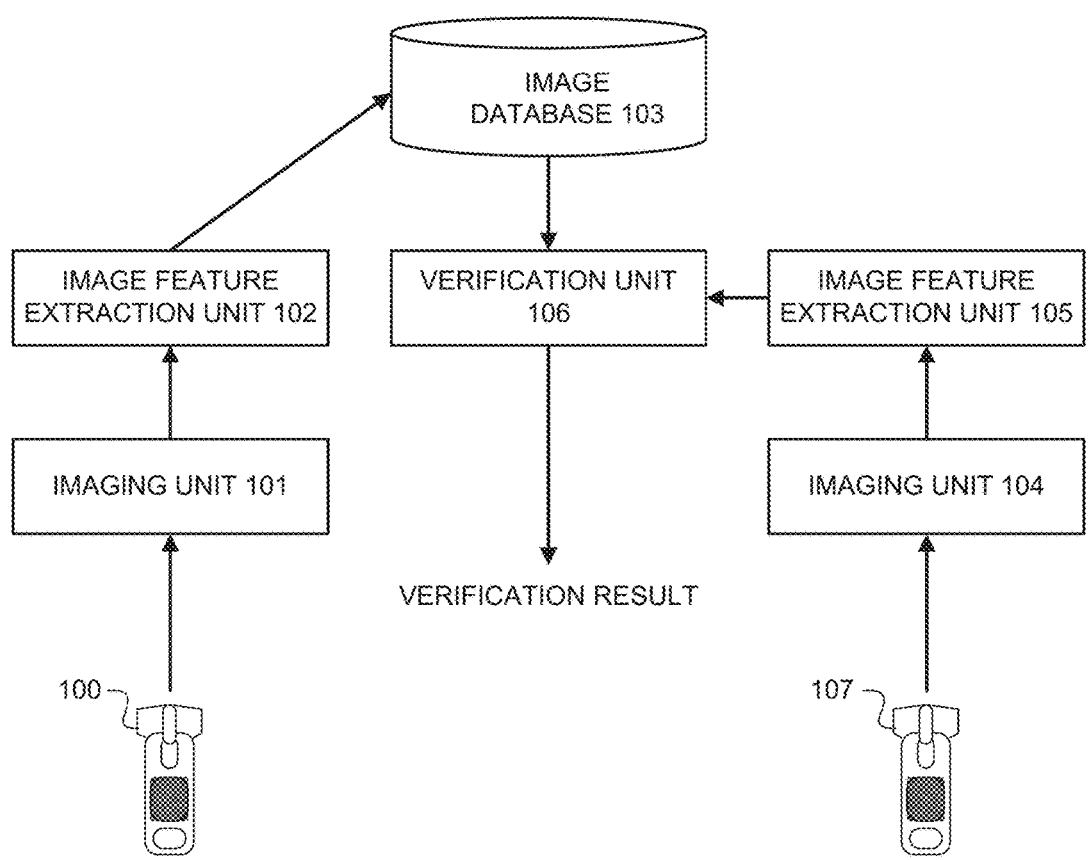
FIG. 6 is a configuration diagram illustrating a verification system of the fastener according to a second embodiment.

FIG. 6 is a configuration diagram illustrating the verification system of the fastener.

An imaging unit 101 is present on the side of a person (fabricator and the like of the fastener) that relates to fabrication of a fastener 100 or a person that performs quality control of the fastener 100, and images the verification area of the fastener 100 by the fabricators or the like. The imaging unit 101 is the same as the above-described adapter 13 and photographic device 15. With regard to the number of pieces to be photographed, in the case of the texture processing through the mold, an approximately identical textured pattern is formed in each mold. Therefore, several fasteners may be selected in each mold, and the selected fasteners may be photographed. Further, regardless of a file format of the imaged image, JPEG or the like may be used.

An image feature extraction unit 102 extracts the image features of the textured pattern in the verification area from the image imaged by the imaging unit 101. In the extraction of the image features, an extraction technology of the image features of fingerprints such as luminance values and minutiae of the image, inflection points, intersection points, end-points, and central points of lines of a binary image can be used. The above-described extracted image features are registered in an image feature database 103.

As illustrated in FIG. 7, the image feature database 103 stores the mold and the image features of the textured pattern in the verification area of the fastener 100 processed by the mold in association with each other. In addition, the mold and the image features may be stored in association with production information about production places, merchandise category, and production date and time, or distribution information about shipment destinations, shipment date, and the like. Through the above, history information about the fastener to be verified can be also acquired.

An imaging unit 104 and an image feature extraction unit 105 are present on the side of an inspection department of the fastener or on the side where the fastener is verified, such as a shipment destination of the fastener. The imaging unit 104 and the image feature extraction unit 105 have the same configurations as those of the imaging unit 101 and the image feature extraction unit 102, respectively.

A verification unit 106 verifies the image feature in the verification area of a fastener 107 to be verified extracted by the image feature extraction unit 105 and the image features stored in the image feature database 103. In the case where both are consistent with each other, the verification unit 106 determines that the fastener 107 to be verified is a regular fastener registered in the image feature database 103. For example, when the image feature of the fastener 107 is "YYY", the fastener 107 can be identified as a fastener processed by the mold 2. In addition, with regard to a method for verifying the image features, for example, end-points and intersection points of lines and corners of the textured pattern are designated as the minutiae, and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, according to the present embodiment, a special device such as a tag for identifying the article or an RFID is not required. Further, an individual of the components or the mold for manufacturing the article can be verified by the textured pattern generated in a normal production process of the components. In particular, in the second embodiment, since the texture processing is performed by the mold, an approximately identical textured pattern is formed in each mold. Therefore, for example, when the verification is performed in each mold, it is useful for a quality inspection and the like in each mold. Further, since an imitation component or the like is fabricated by using the mold different from that of a regular component, the imitation component can be also determined.

Third Embodiment

A third embodiment will be described.

In the case where an article is designated as a fastener as an example and the fastener has a textured pattern provided thereto separately by blasting, the third embodiment relates to a verification system of the fastener.

Figure 8:
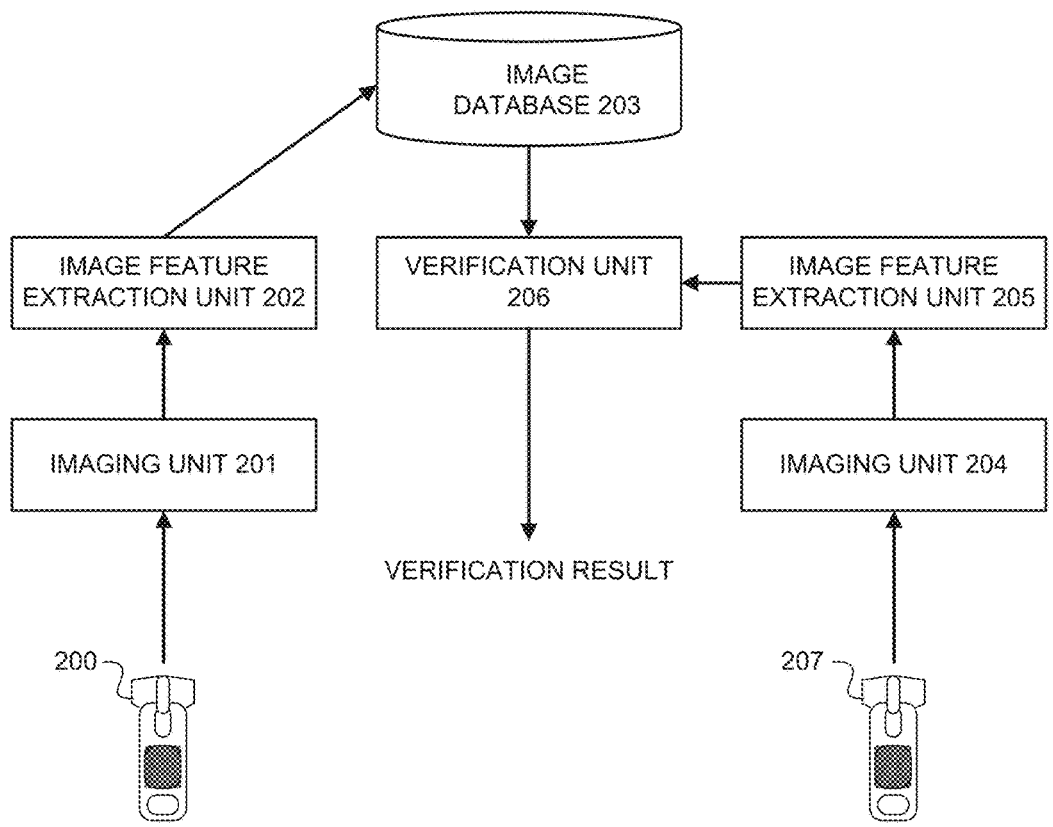
FIG. 8 is a configuration diagram illustrating the verification system of the fastener according to a third embodiment.

FIG. 8 is a configuration diagram illustrating the verification system of the fastener.

An imaging unit 201 is present on the side of a person (a fabricator and the like of the fastener) that relates to fabrication of a fastener 200 or a person that performs quality control of the fastener 200, and images the verification area of the fastener 200 by the fabricators or the like. The imaging unit 201 is the same as the above-described adapter 13 and photographic device 15. Further, regardless of a file format of the imaged image, JPEG or the like may be used.

An image feature extraction unit 202 extracts the image features of the textured pattern in the verification area from the image imaged by the imaging unit 201. In the extraction of the image features, an extraction technology of the image features of fingerprints such as luminance values and minutiae of the image, inflection points, intersection points, end-points, and central points of lines of a binary image can be used. The image features extracted as described above are registered in an image feature database 203.

As illustrated in FIG. 9, the image feature database 203 stores the identification information for identifying an individual of the fastener 200 and the image feature of the textured pattern in the verification area of the fastener 200 in association with each other. In addition, the identification information and the image feature may be stored in association with production information about production places, merchandise category, and production date and time, or distribution information about shipment destinations, shipment date, and the like. Through the above, history information about the fastener to be verified can be also acquired.

An imaging unit 204 and an image feature extraction unit 205 are present on the side of an inspection department of the fastener or on the side where the fastener is verified, such as a shipment destination of the fastener. The imaging unit 204 and the image feature extraction unit 205 have the same configurations as those of the imaging unit 201 and the image feature extraction unit 202, respectively.

A verification unit 206 verifies the image feature in the verification area of a fastener 207 to be verified extracted by the image feature extraction unit 205 and the image features stored in the image feature database 203. In the case where both are consistent with each other, the verification unit 206 determines that the fastener 207 to be verified is a regular fastener registered in the image feature database 203. For example, when the image feature of the fastener 207 are "YYY", the fastener 207 can be identified as a fastener identified by the identification information "fastener 2". In addition, with regard to a method for verifying the image features, for example, end-points and intersection points of lines, and corners of the textured pattern are designated as the minutiae and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, according to the present embodiment, a special device such as a tag for identifying the article or an RFID tag is not required. Further, the component can be verified by the textured pattern generated in a normal production process of the component. In particular, in the third embodiment, since the texture processing is performed by a processing trace, the textured pattern that is different in each component is formed. Therefore, the verification of the component can be identified in an individual level.

Fourth Embodiment

A fourth embodiment will be described.

In the case where an article is designated as a fastener as an example, and blasting, texture processing using powder painting, or a plating process is applied as a process in a subsequent stage on a textured pattern of the fastener provided by a mold, the fourth embodiment relates to a verification system of the fastener.

Figure 10:
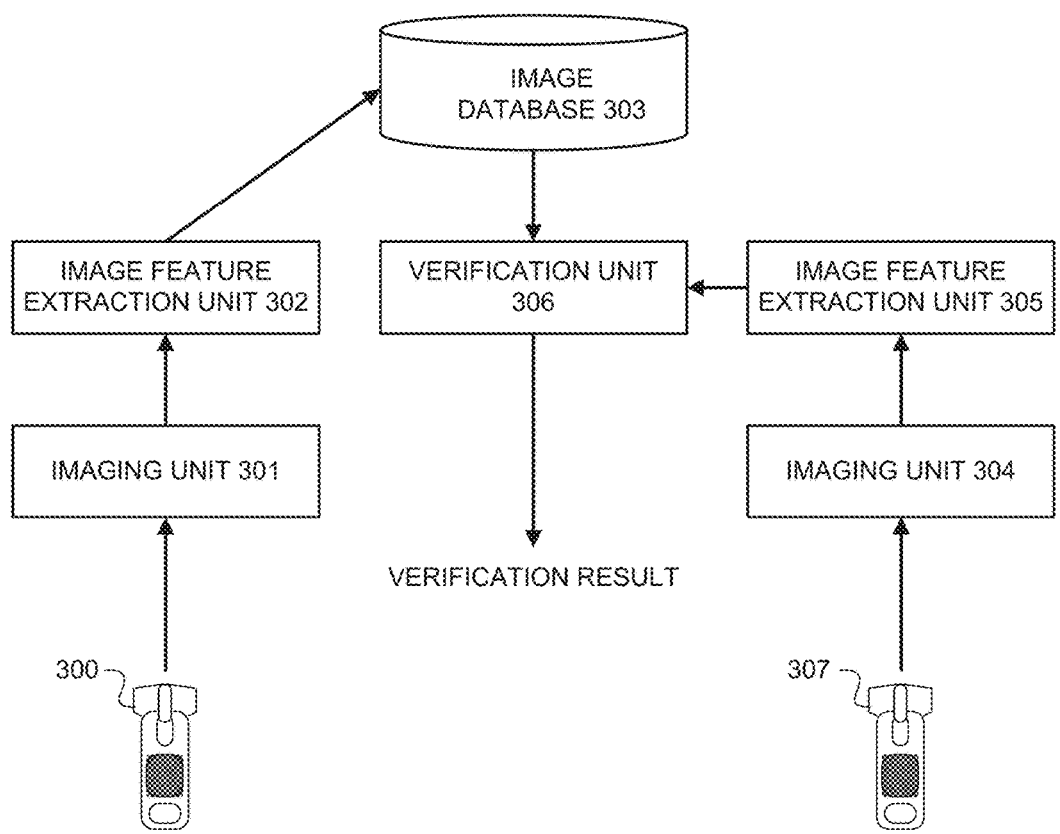
FIG. 10 is a configuration diagram illustrating the verification system of the fastener according to a fourth embodiment.

FIG. 10 is a configuration diagram illustrating the verification system of the fastener.

An imaging unit 301 is present on the side of a person that relates to fabrication of a fastener 300 (fabricator and the like of the fastener) or a person that performs quality control of the fastener 300, and images a verification area of the fastener 300 by the fabricators or the like. The imaging unit 301 is the same as the above-described adapter 13 and photographic device 15. Further, regardless of a file format of the imaged image, JPEG or the like may be used.

The image feature extraction unit 302 extracts the image features of the textured pattern in the verification area from the image imaged by the imaging unit 301. In the extraction of the image features, an extraction technology of the image features of fingerprints such as luminance values and minutiae of the image, inflection points, intersection points, end-points, and central points of lines of a binary image can be used. The image features extracted as described above are registered in an image feature database 303.

The image feature of the fastener 300 are acquired. The blasting, texture processing using the powder painting, or a plating process is applied to the fastener 300 as a process in the subsequent stage on the textured pattern provided by the mold. Accordingly, as described above, a difference between features still remains in each mold and a difference between features is further added in each individual due to a process. Therefore, it is to be desired that several samples of the fastener 300 be selected in each mold and only the image features (referred to as mold difference image features) of the textured pattern through the mold before the process in the subsequent stage be acquired. With regard to other individuals, in addition to the textured pattern through the mold, the image feature (individual difference image feature) of the textured pattern after the processing in the subsequent stage are further acquired.

As an example of an acquisition method of each of the mold difference image feature and the individual difference image feature, the following method is used. An each size of the fine irregularities generated by the texture processing in the mold is supposed to be 'a', and a size of the irregularities further generated by the process in the subsequent stage is supposed to be 'b'. Here, for example, the process is supposed to be controlled so that a>b holds. In the image of the individual fabricated by the same mold, mottles of a size 'a' and mottles of a size 'b' are mixed and generated. Here, when only the mottles of a size of approximately 'a' are acquired as the feature point, the mold difference image feature can be acquired. Further, when the mottles of the size 'b' are acquired, the individual difference image feature can be acquired.

The mold difference features are extracted from a plurality of samples, and the average and the like are taken. As a result, a mold can stably be verified.

As illustrated in FIG. 11, the image feature database 303 stores the identification information for identifying an individual of the fastener 300, the image feature of the textured pattern in the verification area through the mold that has the fastener 300 fabricated thereby, and the image feature of the textured pattern in the verification area of a fastener 300 group fabricated by each of the molds in association with each other. In addition, the identification information and the image feature may be stored in association with production information about production places, merchandise category, and production date and time, or distribution information about shipment destinations, shipment date, and the like. Through the above, history information about the fastener to be verified can be also acquired.

An imaging unit 304 and an image feature extraction unit 305 are present on the side of an inspection department of the fastener or on the side where the fastener is verified, such as a shipment destination of the fastener. The imaging unit 304 and the image feature extraction unit 305 have the same configurations as those of the imaging unit 301 and the image feature extraction unit 302, respectively.

A verification unit 306 verifies the image feature in the verification area of a fastener 307 to be verified extracted by the image feature extraction unit 305 and the image features stored in the image feature database 303. In the case where both are consistent with each other, the verification unit 306 determines that the fastener 207 to be verified is a regular fastener registered in the image feature database 203. Here, the verification unit 306 first verifies the image features in the verification area of the fastener 307 to be verified and the image features (mold difference image features) of the textured pattern in the verification area through the mold. Thereby, the verification unit 306 determines the mold that fabricates the fastener 307. Next, the verification unit 306 verifies the individual difference image features of the fastener group fabricated by the determined mold and the individual difference image features of the fastener 307, and verifies an individual of the fastener 307.

As described above, for example, in the case where the image feature of the fastener 307 is "AAA+YYY", the image feature can be divided into the image feature AAA and the image feature YYY, for example, by sorting of a size of the mottle or a thickness of the line. Here, the image feature of the fastener 307 have "AAA", and thereby a fastener is fabricated by the mold A can be determined. Further, the image feature of the fastener 307 group fabricated by the mold A and the image feature "AAA+YYY" of the fastener 307 to be verified are verified, and thereby the fastener 307 is a fastener identified by the identification information fastener 2 can be identified. In addition, with regard to a method for verifying the image feature, for example, end-points and intersection points of lines, and corners of the textured pattern are designated as the minutiae and arrangements of the minutiae are verified. In the case where the number of combinations of the minutiae in the same position (a range within a certain threshold) is more than or equal to a predetermined number, both are consistent with each other is determined. As the above-described verification technology, an existing technology of fingerprint verification can be used.

Further, each of the above-described imaging unit, image feature extraction unit, image feature database, and verification unit may be present individually and mutually connected via a network. Alternatively, several units may be combined.

As described above, the fourth embodiment is characterized in that in addition to the advantageous effects of the second embodiment as described above, even in the case of identifying individuals, all the registered image features are not required to be verified but the verification processing can be fast performed. Further, the hierarchic verification can be also performed in which the verification is not required up to an individual level of the fastener but only the verification of a level of the mold that fabricates the fastener is performed.

An example in which in the first to fourth embodiments as described above, the stored image features of the textured pattern and the image feature of the textured pattern to be verified are verified is described; however, it is not limited thereto. Regardless of the image features, for example, the stored image of the textured pattern and the image of the textured pattern to be verified may be verified.

Further, a fastener that has the textured pattern provided thereto is used as an example, and the first to fourth embodiments are described; however, the article and the textured pattern are not limited thereto. For example, not only to the case where the textured pattern is provided as design, but also to the case where the textured pattern is intentionally provided to a predetermined verification area of the article for identification and verification, the first to fourth embodiments as described above can be apparently applied in the same manner.

Further, not only to the textured pattern provided by processing to metals or synthetic resins (plastics and the like) like the fastener, but also to wrinkle patterns (emboss) or the like on a surface of the leather product as described above, the first to fourth embodiments can be apparently applied in the same manner.

Further, as is apparent from the above description, the image feature extraction unit and the verification unit can be configured by hardware, and also realized by a computer program. In this case, the same functions and operations as those of the embodiments as described above are realized by using a processor operating by a program stored in a program memory.

Further, the embodiments as described above may be partially or entirely described similarly to, but not limited to, the following supplementary notes.

(Supplementary note 1) A verification method including:
designating as a verification area at least a part of a predetermined area of an article that has a textured pattern provided thereto, and previously storing at least one or more image features of the textured pattern of the verification area;
acquiring the image feature of the textured pattern that is provided to the verification area of an article to be verified; and
verifying the article to be verified by using the acquired image feature and the stored image features.

(Supplementary note 2) The verification method described in the supplementary note 1, wherein the stored image features are image features of an image obtained by imaging the textured pattern of the verification area under predetermined lighting conditions, and the image feature of the article to be verified are image feature obtained by imaging the textured pattern provided to the verification area of the article to be verified under the same lighting conditions as the predetermined lighting conditions.

(Supplementary note 3) The verification method described in the supplementary note 1 or 2, wherein the textured pattern is provided by a mold.

(Supplementary note 4) The verification method described in the supplementary note 3, wherein the image feature of the textured pattern provided to the verification area of at least one article are previously stored from among a plurality of articles that have the textured pattern provided thereto by the same mold in each mold.

(Supplementary note 5) The verification method described in the supplementary note 1 or 2, wherein the textured pattern is provided by blasting or powder painting.

(Supplementary note 6) The verification method described in the supplementary note 5, wherein the image features are stored in each individual of the articles.

(Supplementary note 7) The verification method described in any one of the supplementary notes 3 to 6, wherein the textured pattern is provided by blasting, texture processing using the powder painting, or a plating process as a process in a subsequent stage on the textured pattern provided by the mold.

(Supplementary note 8) The verification method described in the supplementary note 7, wherein a roughness of the textured pattern through the mold is made rougher than the roughness of a pattern in a difference between individuals generated by a process in the subsequent stage, and thereby an identification of the mold and the identification of the difference between individuals are easy to be performed independently.

(Supplementary note 9) The verification method described in any one of the supplementary notes 3 to 8, wherein the image features of the textured pattern in the verification area through the mold in each mold and the image features of the textured pattern in the verification area in each individual of the articles are stored, the image feature in the verification area of the article to be verified and the image features through the mold are verified and the mold that provides the textured pattern to the article to be verified is specified, and the image features of an individual group of the article that has the textured pattern provided thereto by the specified mold and the image feature in the verification area of the article to be verified are verified.

(Supplementary note 10) The verification method described in any one of the supplementary notes 1 to 9, wherein the component is a fastener.

(Supplementary note 11) The verification method described in the supplementary note 10, wherein the fastener is at least any one of a slide fastener, a hook and loop fastener, a snap fastener, a rail fastener, a buckle, a cord stopper, a belt adjuster, a loop clutch, a snap button, and a button.

(Supplementary note 12) The verification method described in any one of the supplementary notes 1 to 10, wherein the textured pattern is intentionally provided to an article for identification or verification.

(Supplementary note 13) A verification system comprising:

an image feature storing means for storing at least one or more image features of a textured pattern in a verification area, the verification area being at least a part of a predetermined area of an article that has the textured pattern provided; and a verifying means for verifying, by using the image feature of the textured pattern provided to the verification area of an article to be verified and the stored image features, the article to be verified.

(Supplementary note 14) The verification system described in the supplementary note 13, further including:

an article image feature acquiring means for imaging the textured pattern in the verification area of the article under predetermined lighting conditions and acquiring the image feature of the textured pattern provided to the verification area of the article, and a verification article image feature acquiring means for imaging the textured pattern provided to the verification area of the article to be verified under the same lighting conditions as the predetermined lighting conditions and acquiring the image feature of the article to be verified.

(Supplementary note 15) The verification system described in the supplementary note 13 or 14, wherein the textured pattern is provided by a mold.

(Supplementary note 16) The verification system described in the supplementary note 15, wherein the image features of the textured pattern provided to the verification area of at least one article are previously stored from among a plurality of articles that have the textured pattern provided thereto by the same mold in each mold.

(Supplementary note 17) The verification system described in the supplementary note 13 or 14, wherein the textured pattern is provided by blasting or powder painting.

(Supplementary note 18) The verification system described in the supplementary note 17, wherein the image features are stored in each individual of the articles.

(Supplementary note 19) The verification system described in any one of the supplementary notes 15 to 17, wherein the textured pattern is provided by the blasting, texture processing using the powder painting, or a plating process as a process in a subsequent stage on the textured pattern provided by the mold.

(Supplementary note 20) The verification system described in any one of the supplementary notes 14 to 19, wherein a roughness of the textured pattern through the mold is made rougher than the roughness of a pattern in a difference between individuals generated by a process in the subsequent stage, and thereby an identification of the mold and the identification in the difference between individuals are performed independently.

(Supplementary note 21) The verification system described in any one of the supplementary notes 15 to 20, wherein the image feature storing means stores the image features of the textured pattern in the verification area through the mold in each mold and the image features of the textured pattern in the verification area in each individual of the articles, and the verifying means verifies the image feature in the verification area of the article to be verified and the image features through the mold, specifies the mold that provides the textured pattern to the article to be verified, and verifies the image features of an individual group of the article that has the textured pattern provided thereto by the specified mold and the image feature in the verification area of the article to be verified.

(Supplementary note 22) The verification system described in any one of the supplementary notes 13 to 21, wherein the component is a fastener.

(Supplementary note 23) The verification system described in the supplementary note 22, wherein the fastener is at least any one of a slide fastener, a hook and loop fastener, a snap fastener, a rail fastener, a buckle, a cord stopper, a belt adjuster, a loop clutch, a snap button, and a button.

(Supplementary note 24) The verification system described in any one of the supplementary notes 13 to 23, wherein the textured pattern is intentionally provided to an article for identification or verification.

(Supplementary note 25) An apparatus including:

an acquiring means for acquiring an image obtained by imaging a textured pattern provided to an article; and an outputting means for outputting a result of verifying a first image and a second image obtained by imaging the textured pattern provided to the article.

(Supplementary note 26) The apparatus described in the supplementary note 25, wherein the textured pattern is provided by the mold.

(Supplementary note 27) The apparatus described in the supplementary note 25, wherein the textured pattern is provided by blasting or powder painting.

(Supplementary note 28) The apparatus described in any one of the supplementary notes 25 to 27, wherein the textured pattern is provided by the blasting, texture processing using the powder painting, or a plating process as a process in a subsequent stage on the textured pattern provided by the mold, and a roughness of the textured pattern through the mold is made rougher than the roughness of a pattern in a difference between individuals generated by a process in the subsequent stage, and the outputting means performs a verification of the mold and the verification of the difference between individuals independently.

(Supplementary note 29) The apparatus described in any one of the supplementary notes 25 to 28, wherein the component is a fastener.

(Supplementary note 30) The apparatus described in the supplementary note 29, wherein the fastener is at least any one of a slide fastener, a hook and loop fastener, a snap fastener, a rail fastener, a buckle, a cord stopper, a belt adjuster, a loop clutch, a snap button, and a button.

(Supplementary note 31) The apparatus described in any one of the supplementary notes 25 to 30, wherein the textured pattern is intentionally provided to an article for identification or verification.

(Supplementary note 32) A verification apparatus including:

a verifying means for, by using at least one or more previously-stored image features of a textured pattern in a verification area, the verification area being at least a part of a predetermined area of an article that has the textured pattern provided, and acquired image feature of the textured pattern in the verification area of an article to be verified, verifying the article to be verified.

(Supplementary note 33) The verification apparatus described in the supplementary note 32, wherein the textured pattern is provided by a mold.

(Supplementary note 34) The verification apparatus described in the supplementary note 32 or 33, wherein the stored image features are image features of the textured pattern provided to the verification area of at least one article are previously stored from among a plurality of articles that have the textured pattern provided thereto by the same mold in each mold.

(Supplementary note 35) The verification apparatus described in the supplementary note 32, wherein the textured pattern is provided by blasting or powder painting.

(Supplementary note 36) The verification apparatus described in the supplementary note 35, wherein the stored image features are image features in each individual of the articles.

(Supplementary note 37) The verification apparatus described in any one of the supplementary notes 32 and 33, wherein the textured pattern is provided by the blasting, texture processing using the powder painting, or a plating process as a process in a subsequent stage on the textured pattern provided by the mold, and a roughness of the textured pattern through the mold is made rougher than the roughness of a pattern in a difference between individuals generated by a process in the subsequent stage, and the verifying means performs a verification of the mold and the verification in the difference between individuals independently.

(Supplementary note 38) The verification apparatus described in any one of the supplementary notes 32 to 37, wherein the stored image features are image features of the textured pattern in the verification area through the mold in each mold and image features of the textured pattern in the verification area in each individual of the articles, and the verifying means verifies the image feature in the verification area of the article to be verified and the image features through the mold, specifies the mold that provides the textured pattern to the article to be verified, and verifies the image features of an individual group of the article that has the textured pattern provided thereto by the specified mold and the image feature in the verification area of the article to be verified.

(Supplementary note 39) The verification apparatus described in any one of the supplementary notes 32 to 38, wherein the component is a fastener.

(Supplementary note 40) The verification apparatus described in the supplementary note 39, wherein the fastener is at least any one of a slide fastener, a hook and loop fastener, a snap fastener, a rail fastener, a buckle, a cord stopper, a belt adjuster, a loop clutch, a snap button, and a button.

(Supplementary note 41) The verification apparatus described in any one of the supplementary notes 32 to 40, wherein the textured pattern is intentionally provided to an article for identification or verification.

(Supplementary note 42) A program for causing a computer to execute a verification process of, by using at least one or more previously-stored image features of a textured pattern in a verification area, the verification area being at least a part of a predetermined area of an article that has the textured pattern provided, and acquired image feature of the textured pattern in the verification area of an article to be verified, verifying the article to be verified.

(Supplementary note 43) The program described in the supplementary note 42, wherein the textured pattern is provided by a mold.

(Supplementary note 44) The program described in the supplementary note 42 or 43, wherein the stored image features are image features of the textured pattern provided to the verification area of at least one article are previously stored from among a plurality of articles that have the textured pattern provided thereto by the same mold in each mold.

(Supplementary note 45) The program described in the supplementary note 42, wherein the textured pattern is provided by blasting or powder painting.

(Supplementary note 46) The program described in the supplementary note 45, wherein the stored image features are image features in each individual of the articles.

(Supplementary note 47) The program described in any one of the supplementary notes 42 to 46, wherein the textured pattern is provided by the blasting, texture processing using the powder painting, or a plating process as a process in a subsequent stage on the textured pattern provided by the mold, and a roughness of the textured pattern through the mold is made rougher than the roughness of a pattern in a difference between individuals generated by a process in the subsequent stage, and in the verification process, a verification of the mold and the verification of the difference between individuals are performed independently.

(Supplementary note 48) The program described in any one of the supplementary notes 42 to 47, wherein the stored image features are image features of the textured pattern in the verification area through the mold in each mold and image features of the textured pattern in the verification area in each individual of the articles, and in the verification process, the image feature in the verification area of the article to be verified and the image features through the mold are verified, the mold that provides the textured pattern to the article to be verified is specified, and the image features of an individual group of the article that has the textured pattern provided thereto by the specified mold and the image feature in the verification area of the article to be verified are verified.

(Supplementary note 49) The program described in any one of the supplementary notes 42 to 48, wherein the component is a fastener.

(Supplementary note 50) The program described in the supplementary note 49, wherein the fastener is at least any one of a slide fastener, a hook and loop fastener, a snap fastener, a rail fastener, a buckle, a cord stopper, a belt adjuster, a loop clutch, a snap button, and a button.

(Supplementary note 51) The program described in any one of the supplementary notes 42 to 50, wherein the textured pattern is intentionally provided to an article for identification or verification.

Each embodiment as described above is a mere preferable embodiment of the present invention and thus the present invention will not be limited only to the embodiment. It is possible to carry out the present invention with various changes and modifications without departing from the spirit and scope of the invention.

This application is based upon and claims the benefit of priority of the prior Japanese Patent Application No. 2012-140356, filed on Jun. 22, 2012, the entire contents of which are incorporated herein by reference.

REFERENCE SIGNS LIST

1 Image feature storage unit
2 Verification unit
3 Acquisition unit
4 Verification unit
10 Fastener
11 Textured pattern
12 Verification area
13 Adapter
14 Imaging hole
15 Photographic device
16 Light source
100 Fastener
101 Imaging unit
102 Image feature extraction unit
103 Image feature database
104 Imaging unit
105 Image feature extraction unit
106 Verification unit
107 Fastener
200 Fastener
201 Imaging unit
202 Image feature extraction unit
203 Image feature database
204 Imaging unit
205 Image feature extraction unit
206 Verification unit
207 Fastener
300 Fastener
301 Imaging unit
302 Image feature extraction unit
303 Image feature database
304 Imaging unit
305 Image feature extraction unit
306 Verification unit
307 Fastener

The invention claimed is:

1. A verification method comprising executing on a processor:
designating as a verification area at least a part of a predetermined area of an article that has a textured pattern provided thereto, and previously storing at least an image feature including a luminance pattern of an image of the textured pattern in the verification area in a storage, wherein
the image of the textured pattern in the verification area was imaged under predetermined lighting conditions and a fixed attitude of the article,
the textured pattern was provided by one of a plurality of molds, and
the image feature is stored as a representative value for a group of articles that have textured patterns provided thereto by the one of the plurality of molds;
acquiring an image feature including a luminance pattern of a textured pattern that is provided to a verification area of an article to be verified; and
verifying the article to be verified by using the acquired image feature and stored representative values corresponding to the plurality of molds, wherein the textured pattern in the verification area of the article to be verified was imaged under the predetermined lighting conditions and the fixed attitude,
wherein, in a subsequent stage to providing the textured pattern by one of the plurality of molds on each article in the group of articles, a process of blasting, texture processing using powder painting, or plating was applied to generate a random pattern on the textured pattern.

2. A verification system comprising:
an image feature storage storing at least an image feature including a luminance pattern of an image of a textured pattern in a verification area, the verification area being at least a part of a predetermined area of an article that has the textured pattern provided thereto, wherein
the image of the textured pattern in the verification area was imaged under predetermined lighting conditions and a fixed attitude of the article,
the textured pattern was provided by one of a plurality of molds, and
the image feature is stored as a representative value for a group of articles that have textured patterns provided thereto by the one of the plurality of molds; and
a processor programmed to acquire an image feature including a luminance pattern of an image of a textured pattern provided to a verification area of an article to be verified, and verify the article to be verified by using the acquired image feature and stored representative values corresponding to the plurality of molds, wherein the textured pattern in the verification area of the article to be verified was imaged under the predetermined lighting conditions and the fixed attitude,
wherein, in a subsequent stage to providing the textured pattern by one of the plurality of molds on each article in the group of articles, a process of blasting, texture processing using powder painting, or plating was applied to generate a random pattern on the textured pattern.

3. The verification system according to claim 2, wherein individual difference image features are stored for corresponding articles in the group of articles.

4. The verification system according to claim 3, wherein a roughness of the textured pattern provided by the one of the plurality of molds on an article in the group of articles is made rougher than the roughness of a pattern of the corresponding individual difference image feature generated by the process in the subsequent stage, and thereby an identification of the one of the plurality of molds and an identification of an article in the group of articles are performed independently.

5. The verification system according to claim 3, wherein the image feature storage stores image features of textured patterns provided by the plurality of molds and the individual difference image features for articles in groups of articles corresponding to the plurality of molds, and
the processor is further programmed to verify the image feature in the verification area of the article to be verified and the image feature stored as a representative value, specify the mold that provides the textured pattern to the article to be verified, and verify the individual difference image features of an individual group of the article that has the textured pattern provided thereto by the specified mold and the individual difference image feature in the verification area of the article to be verified.

6. The verification system according to claim 2, wherein a component of each of the plurality of articles is a fastener.

7. The verification system according to claim 6, wherein the fastener is at least any one of a slide fastener, a hook and loop fastener, a snap fastener, a rail fastener, a buckle, a cord stopper, a belt adjuster, a loop clutch, a snap button, and a button.

8. An apparatus comprising:
a processor programmed to acquire an image obtained by imaging a textured pattern provided to an article, wherein
the textured pattern provided to the article was imaged under predetermined lighting conditions and fixed attitude of the article,
the textured pattern was provided by one of a plurality of molds, and
a representative value is stored for a group of articles that have textured patterns provided thereto by the one of the plurality of molds; and
output a result of verifying an image feature including a luminance pattern of a first image and an image feature including a luminance pattern of a second image obtained by imaging the textured pattern provided to the article, wherein the image feature including the luminance pattern of the first image is the representative value,
wherein, in a subsequent stage to providing the textured pattern by one of the plurality of molds on each article in the group of articles, a process of blasting, texture processing using powder painting, or plating was applied to generate a random pattern on the textured pattern.

9. The apparatus according to claim 8, wherein
a roughness of the textured pattern provided by the one of the plurality of molds on an article in the group of articles is made rougher than the roughness of a pattern of a corresponding individual difference image feature generated by the process in the subsequent stage, and
the processor is further programmed to perform a verification of the one of the plurality of molds and the verification of an article in the group of articles independently.

10. A verification apparatus comprising:
a processor programmed to:
acquire an image feature including a luminance pattern of an image of a textured pattern provided to a verification area of an article to be verified, wherein
the textured pattern was provided by one of a plurality of molds, and
the image feature of the textured pattern was previously stored as a representative value for a group of articles that have textured patterns provided thereto by the one of the plurality of molds, and
verify the article to be verified by using at least one or more previously-stored representative values corresponding to the plurality of molds, wherein
the verification area is at least a part of a predetermined area of the article that has the textured pattern provided thereto,
the acquired image feature includes the luminance pattern of the image of the textured pattern in the verification area of the article to be verified, and
the textured pattern provided to the article was imaged under predetermined lighting conditions and fixed attitude of the article,
wherein, in a subsequent stage to providing the textured pattern by one of the plurality of molds on each article in the group of articles, a process of blasting, texture processing using powder painting, or plating was applied to generate a random pattern on the textured pattern.

11. A non-transitory computer readable storage medium storing a program for causing a computer to execute:
an acquisition process of acquiring an image feature including a luminance pattern of an image of a textured pattern provided to a verification area of an article to be verified, wherein
the textured pattern was provided by one of a plurality of molds, and
the image feature of the textured pattern was previously stored as a representative value for a group of articles that have textured patterns provided thereto by the one of the plurality of molds, and
a verification process of verifying the article to be verified by using at least one or more previously-stored representative values corresponding to the plurality of molds, wherein
the verification area is at least a part of a predetermined area of the article that has the textured pattern provided,
the acquired image feature includes the luminance pattern of the image of the textured pattern in the verification area of the article to be verified, and
the textured pattern provided to the article was imaged under predetermined lighting conditions and fixed attitude of the article,
wherein, in a subsequent stage to providing the textured pattern by one of the plurality of molds on each article in the group of articles, a process of blasting, texture processing using powder painting, or plating was applied to generate a random pattern on the textured pattern.

\* \* \* \* \*